United States Patent
Martinez et al.

(10) Patent No.: US 8,541,502 B2
(45) Date of Patent: Sep. 24, 2013

(54) TWO/THREE COMPONENT COMPATIBLE POLYOLEFIN COMPOUNDS

(75) Inventors: Felipe Martinez, Houston, TX (US); Pankaj Gupta, Midland, MI (US); Ashish Batra, Lake Jackson, TX (US)

(73) Assignee: Dow Global Technologies LLC, Wilmington, DE (US)

( * ) Notice: Subject to any disclaimer, the term of this patent is extended or adjusted under 35 U.S.C. 154(b) by 19 days.

(21) Appl. No.: 12/995,327

(22) PCT Filed: May 29, 2009

(86) PCT No.: PCT/US2009/045728
§ 371 (c)(1),
(2), (4) Date: Nov. 30, 2010

(87) PCT Pub. No.: WO2009/146438
PCT Pub. Date: Dec. 3, 2009

(65) Prior Publication Data
US 2011/0082256 A1    Apr. 7, 2011

Related U.S. Application Data

(60) Provisional application No. 61/057,511, filed on May 30, 2008, provisional application No. 61/061,446, filed on Jun. 13, 2008.

(51) Int. Cl.
| | |
|---|---|
| *C08L 23/08* | (2006.01) |
| *C08L 51/06* | (2006.01) |
| *C08L 23/00* | (2006.01) |
| *C08L 23/14* | (2006.01) |
| *C08L 33/06* | (2006.01) |
| *B32B 27/32* | (2006.01) |

(52) U.S. Cl.
USPC ............. 525/70; 525/74; 525/79; 525/191; 525/207; 525/222; 428/500

(58) Field of Classification Search
USPC ........ 525/70, 74, 79, 191, 207, 222; 428/500
See application file for complete search history.

(56) References Cited

U.S. PATENT DOCUMENTS

| | | | |
|---|---|---|---|
| 5,674,930 A | 10/1997 | Sugiura et al. | |
| 5,705,565 A | 1/1998 | Hughes et al. | |
| 2006/0199911 A1* | 9/2006 | Markovich et al. | 525/192 |
| 2007/0261878 A1* | 11/2007 | Kosaka et al. | 174/110 SR |
| 2010/0292403 A1* | 11/2010 | Ansems et al. | 525/125 |

FOREIGN PATENT DOCUMENTS

| | | |
|---|---|---|
| JP | 55-073740 A | 6/1980 |
| JP | 03-074439 A | 3/1991 |
| JP | 05-170988 A | 7/1993 |
| WO | 2007/146875 A2 | 12/2007 |
| WO | 2008/054637 A1 | 5/2008 |

OTHER PUBLICATIONS

International Search Report from PCT/US2009/045728 dated Sep. 9, 2009 (3 pages).
Written Opinion from PCT/US2009/045728 dated Sep. 9, 2009 (6 pages).
Communication pursuant to Rules 161(1) and 162 EPC issued Jan. 19, 2011 in corresponding EP application No. 09755798.7-1214 (2 pages).

* cited by examiner

*Primary Examiner* — Jeffrey Mullis
(74) *Attorney, Agent, or Firm* — Osha Liang LLP

(57) ABSTRACT

A polyolefin compound including: A) at least one thermoplastic olefin copolymer including the reaction product of olefin 1 and olefin 2, wherein: olefin 1 is a $C_2$ based olefin and olefin 2 is a $C_3$ to $C_8$ α-olefin or olefin 1 is a $C_3$ based olefin and olefin 2 is a $C_4$ to $C_8$ α-olefin; B) at least one functional polymer, the functional polymer content in the polyolefin compound being between 1 and 75 weight percent of the combined components A and B; wherein the thermoplastic olefin copolymer and the functional polymer form a co-continuous phase; wherein: a) an I2 melt index of the polyolefin compound is from about 1 to about 15 as measured using ASTM D 1238; b) a Shore A hardness of the polyolefin compound is from about 55 to about 100 as measured using ASTM D2240; c) a flexural modulus of the polyolefin compound is from about 0.8 to about 30 kpsi as measured using ASTM D790.

12 Claims, 2 Drawing Sheets

Figure 1A – DSC
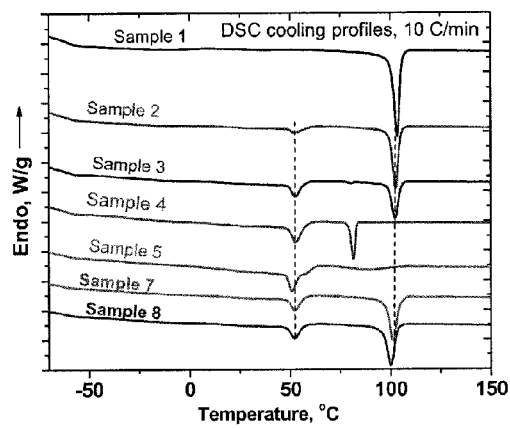
Figure 1B – DSC
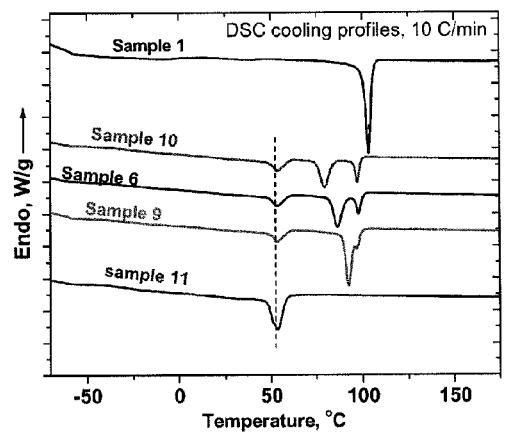
Figure 2A – TMA
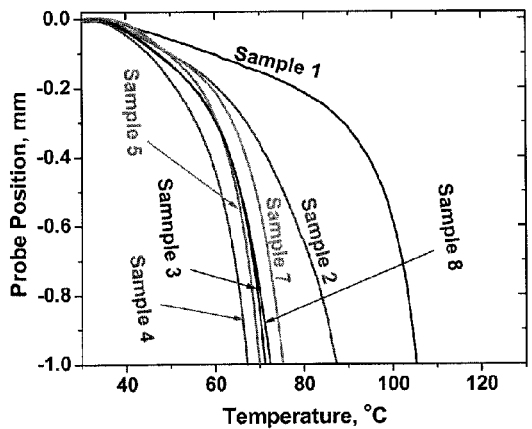
Figure 2B – TMA
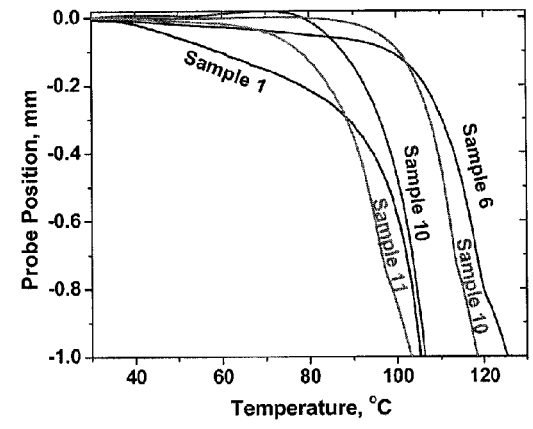

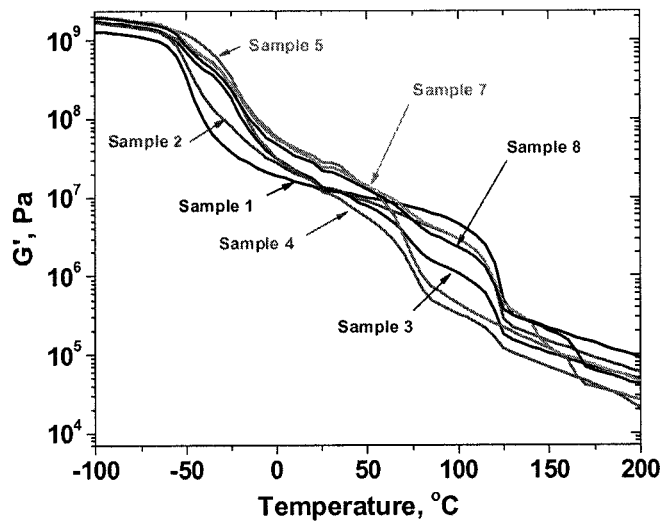
Figure 3A – DMS
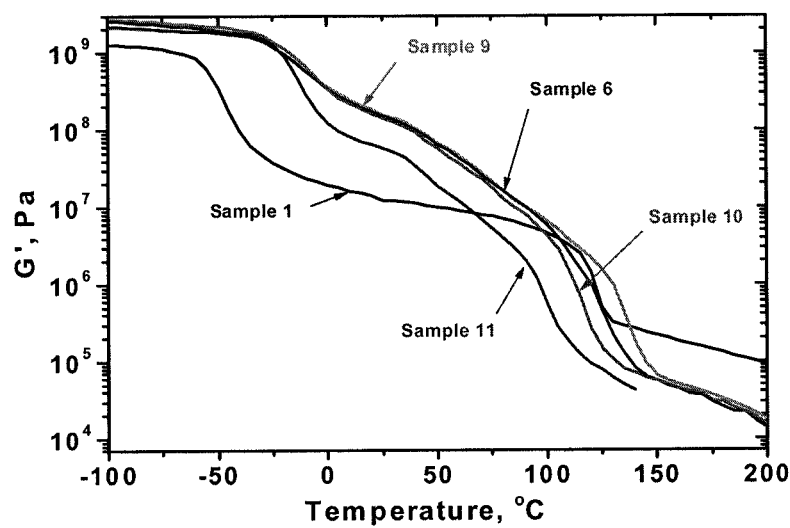
Figure 3B – DMS

TWO/THREE COMPONENT COMPATIBLE POLYOLEFIN COMPOUNDS

BACKGROUND OF THE DISCLOSURE

1. Field of the Disclosure

Embodiments disclosed herein relate generally to two or three component compatible polyolefin compounds having sufficient adhesion required for various applications. In another aspect, embodiments disclosed herein relate to two or three component compatible polyolefin compounds having sufficient adhesion and shock absorption useful in footwear applications. In yet another aspect, embodiments disclosed herein relate to a method of producing two or three component compatible polyolefin compounds and various composites using those compounds, having sufficient adhesion and shock absorption.

2. Background

Athletic shoes can produce a substantial impact stress on the foot when the foot strikes the ground. The stress is particularly intense in those sports that are practiced on artificial or other hard surfaces, such as track and field, basketball, volleyball, tennis, football, soccer, and numerous other sports. To cushion the impact stress on the foot, the sole of shoes designed for such activities includes one or more shock absorbing layers. The greatest need for shock absorption is in the zones of the foot where the stresses are greatest, which normally correspond to the bearing point of the heel. The primary objectives of a shock-absorbing sole include providing a better comfort and the least sensation of fatigue for such activities as walking, running, and jumping, while at the same time ensuring good shock absorption to protect the foot.

Most footwear articles include two primary elements, an upper and a sole structure. The upper provides a covering for the foot that securely receives and positions the foot with respect to the sole structure and is usually attached to one or more parts of the shoe sole.

The shoe sole structure typically incorporates multiple layers that are conventionally referred to as an insole, a midsole, and an outsole. The insole is a thin soft solid or foamed comfort-enhancing member located in the upper portion of the sole, adjacent to the plantar (lower) surface of the foot to enhance footwear comfort. The midsole forms the middle layer of the sole structure and serves a variety of purposes that include controlling foot motions and attenuating ground reaction forces via shock absorption. The outsole forms the ground-contacting element of the footwear and is usually fashioned from a durable, wear-resistant material that includes texturing to improve traction.

The primary element of a conventional midsole shock absorbing layer is a resilient polymer material, such as foamed polyurethane, foamed crosslinked EVA (ethylene vinyl acetate), or other foamed crosslinked polyolefin elastomer, which extends throughout the length of the footwear. The properties of the shock absorbing layer are primarily dependent upon factors that include dimensional configuration of the midsole and the specific characteristics of the polymer material. By varying these factors throughout the midsole, the relative stiffness, degree of ground reaction force attenuation, and energy absorption properties may be altered in order to meet the specific demands of the activity for which the footwear is intended to be used.

New casual and athletic shoes are using a different shock absorption design approach, eliminating traditional foamed midsoles and replacing them by structural injection molded arched parts that provide an appealing looks as well as most of the shock absorption requirements. In the absence of a traditional foamed midsole, these new designs usually require a thicker insole layer to maintain overall shoe comfort. A number of material properties must be considered in the design of thermoplastic compounds for thermoplastic injection molded shock absorbing systems, including, but not limited to: general mechanical strength, dynamic deformation, thermal resistance, adhesion, and optics. However, in many applications, a single polymer cannot provide optimal material properties in all the required performance areas.

To remedy the performance shortcomings of individual polymers and the resulting structural injection molded designs, specially engineered polymer compounds can be developed using various techniques, including copolymerization and polymer compounding. In formulating the polymer compounds and compounds, for example, for athletic shoe shock absorbers, various material selection trade-offs must be made that directly impact the overall shoe design features, including functionality, weight, and aesthetics. For example, an increased thickness of the midsole to increase the shock and energy absorption diminishes the shoe's lightweight properties, stability, and visual appeal.

In general, shock absorbers for athletic shoe soles are made from materials exhibiting good flexibility, resiliency and dynamic deformation. As previously discussed, these properties are required to provide foot protection from impact stresses and to elastically recover a portion of the energy as rebound force while walking. In addition, as the shock absorbing midsole layer or system is typically placed between other layers or surfaces, such as the outsole, the insole, or the shoe upper, the shock absorbing layer must have good adhesion to the other shoe layers. The polymer compound or blend must also have good thermal resistance to ensure that mechanical and dynamic properties are not sacrificed throughout a range of potential exposure temperatures and that the polymer does not degrade. Further, the polymer compound or blend may require adequate optical properties, such as transparency, to provide aesthetic appeal.

Polymer compounds from a group commonly referred to as thermoplastic elastomers (TPE) are frequently used in various shock absorbing applications, for example, in forming solid structural injection molded shock-absorbing shoe systems. TPE's may exhibit both plastic and elastic behavior, and thus may provide various advantages over other polymers and composites. Six general classes of TPE's include: polyolefin elastomers (POE), thermoplastic polyurethanes (TPU), styrenic block copolymers (SBC), elastomeric alloys, polyester elastomers (PEE), and thermoplastic polyamids.

TPU's are frequently used in shock absorbing applications, for example, in athletic shoes. In general, polyurethanes may be formed by reacting a diisocyanate, a monomer containing at least two isocyanate functional groups, with a polyol, a monomer containing at least two alcohol groups. TPU's typically possess high resiliency, and may be formulated to have a wide range of stiffness, hardness, and density.

PEE's are another type of elastomers widely used in shock absorbing structural applications. In general, polyesters contain the ester functional group, and may be formed via an esterification reaction.

High performance materials like TPU's and PEE's are frequently used in various footwear items. However, such high-performance elastomers are relatively expensive and are overdesigned for most applications that do not require top mechanical strength or dynamic deformation properties.

Thus, there is still a significant need for high-value polymer compounds that provide good shock absorbing performance in footwear applications at lower cost to compete with the traditional high-cost performance materials, such as TPU's and PEE's.

SUMMARY OF THE CLAIMED EMBODIMENTS

In one aspect, embodiments disclosed herein relate to a polyolefin compound including: A) at least one thermoplastic olefin copolymer including the reaction product of olefin 1 and olefin 2, wherein: olefin 1 is a $C_2$ based olefin and olefin 2 is a $C_3$ to $C_8$ α-olefin; or olefin 1 is a $C_3$ based olefin and olefin 2 is a $C_4$ to $C_8$ α-olefin; B) at least one functional polymer, the functional polymer content in the polyolefin compound being between 1 and 75 weight percent of the combined components A and B, and preferably wherein the thermoplastic olefin copolymer and the functional polymer form a co-continuous phase; and wherein a) an I2 melt index of the polyolefin compound is from about 1 to about 15 as measured using ASTM D1238; b) a Shore A hardness of the polyolefin compound is from about 20, preferably 55 to about 100 as measured using ASTM D2240; c) a flexural modulus of the polyolefin compound is from about 0.8 to about 30 kpsi as measured using ASTM D790.

In another aspect, embodiments disclosed herein relate to a composite including: at least one shock absorbing layer comprising a polyolefin compound and at least one non-polyolefin substrate layer, the polyolefin compound comprising: A) at least one thermoplastic olefin copolymer comprising the reaction product of olefin 1 and olefin 2, wherein: olefin 1 is a $C_2$ based olefin and olefin 2 is a $C_3$ to $C_8$ α-olefin or olefin 1 is a $C_3$ based olefin and olefin 2 is a $C_4$ to $C_8$ α-olefin; B) at least one functional polymer, the functional polymer content in the polyolefin compound being between 1 and 75 weight percent of the combined components A and B; wherein the thermoplastic olefin copolymer and the functional polymer form a co-continuous phase; and wherein a) an I2 melt index of the polyolefin compound is from about 1 to about 15 as measured using ASTM D1238; b) a Shore A hardness of the polyolefin compound is from about 55 to about 100 as measured using ASTM D2240; c) a flexural modulus of the polyolefin compound is from about 0.8 to about 30 kpsi as measured using ASTM D790.

In other aspects, embodiments disclosed herein relate to a shoe composite having at least one shock absorbing layer including the polyolefin compound as described above and at least one non-polyolefin substrate layer.

In other aspects, embodiments disclosed herein relate to a car bumper composite having at least one shock absorbing layer including the polyolefin compound as described above and at least one non-polyolefin substrate layer.

In other aspects, embodiments disclosed herein relate to artificial turf composites having at least one shock absorbing layer including the polyolefin compound as described above and at least one non-polyolefin substrate layer.

In yet another aspect, embodiments disclosed herein relate to a polyolefin compound, as described above, in the form of an adhesive.

Other aspects and advantages will be apparent from the following description and the appended claims.

BRIEF DESCRIPTION OF FIGURES

FIGS. 1A and 1B compare results of the Differential Scanning Calorimetry (DSC) thermal properties of various polyolefin elastomer compound samples according to embodiments disclosed herein.

FIGS. 2A and 2B compare results of the Thermomechanical Analysis (TMA) cooling profiles of various polyolefin elastomer compound samples according to embodiments disclosed herein.

FIGS. 3A and 3B compare results of the Dynamic Mechanical Spectroscopy (DMS) testing of various polyolefin elastomer compound samples according to embodiments disclosed herein.

DETAILED DESCRIPTION

General Definitions and Measurement Methods: The following terms shall have the given meaning for the purposes of this disclosure:

"Polymer" means a substance composed of molecules with large molecular mass consisting of repeating structural units, or monomers, connected by covalent chemical bonds. The term 'polymer' generally includes, but is not limited to, homopolymers, copolymers such as block, graft, random and alternating copolymers, terpolymers, etc., and blends and modifications thereof. Further, unless otherwise specifically limited, the term 'polymer' shall include all possible geometrical configurations of the molecular structure. These configurations include isotactic, syndiotactic, random configurations, and the like.

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). The class of materials known as "interpolymers" also encompasses polymers made by polymerizing four or more types of monomers.

"Melt Index" or I2 is determined according to ASTM D1238 using a weight of 2.16 kg at 190° C. for polymers comprising ethylene as the major component in the polymer. "Melt Flow Rate" (MFR) is determined according to ASTM D1238 using a weight of 2.16 kg at 230° C. for polymers comprising propylene as the major component in the polymer.

"Molecular weight distribution" (MWD) of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent polypropylene molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N. Y. Hellman, P. M. Muglia, Macromolecules, 4, 507 (1971)) in the Mark-Houwink equation:

$\{N\} = KM^a$ where $K_{pp} = 1.90E\text{-}04$, $a_{pp} = 0.725$ and $K_{ps} = 1.26E\text{-}04$, $a_{ps} = 0.702$.

The term "high pressure low density type resin" is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference) and includes "LDPE" which may also be referred to as "high pressure ethylene polymer" or "highly branched polyethylene." The cumulative detector fraction (CDF) of these materials is greater than about 0.02 for a molecular weight greater than 1000000 g/mol as measured using light scattering. CDF may be determined as described in WO2005/023912 A2, which is herein incorporated by reference for its teachings regarding CDF. The preferred high pressure low density polyethylene material (LDPE) has a melt index MI (I2) of less than about 20, more preferably less than about 15, most preferably less than 10, and greater than about 0.1, more preferably greater than about 0.2, most preferably more than 0.3 g/10 min. The preferred LDPE will have a density between about 0.915 g/cm³ and 0.930 g/cm³, with less than 0.925 g/cm³ being more preferred.

"Crystallinity" means atomic dimension or structural order of a polymer composition. Crystallinity is often represented by a fraction or percentage of the volume of the material that is crystalline or as a measure of how likely atoms or molecules are to be arranged in a regular pattern, namely into a crystal. Crystallinity of polymers can be adjusted fairly precisely and over a very wide range by heat treatment. A "crystalline" "semi-crystalline" polymer possesses a first order transition or crystalline melting point (Tm) as determined by differential scanning calorimetry (DSC) or equivalent technique. The term may be used interchangeably with the term "semicrystalline." The term "amorphous" refers to a polymer lacking any crystallinity and, as a result, the crystalline melting point as determined by differential scanning calorimetry (DSC) or equivalent technique.

Differential Scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., Thermal Characterization of Polymeric Materials, Academic Press, 1981). DSC is a method suitable for determining the melting characteristics of a polymer.

DSC analysis of the polymers disclosed herein may be performed using a model Q1000 DSC from TA Instruments, Inc. DSC is calibrated by the following method. First, a baseline may be obtained by running the DSC from −90° C. to 290° C. without any sample in the aluminum DSC pan. Then 7 milligrams of a fresh indium sample may be analyzed by heating the sample to 180° C., cooling the sample to 140° C. at a cooling rate of 10° C./min followed by keeping the sample isothermally at 140° C. for 1 minute, and by heating the sample from 140° C. to 180° C. at a heating rate of 10° C./min. The heat of fusion and the onset of melting of the indium sample may be determined and checked to be within 0.5° C. to 156.6° C. for the onset of melting and within 0.5 J/g to 28.71 J/g for the heat of fusion. Then deionized water may be analyzed by cooling a small drop of fresh sample in the DSC pan from 25° C. to −30° C. at a cooling rate of 10° C./min. The sample may be kept isothermally at −30° C. for 2 minutes and heated to 30° C. at a heating rate of 10° C./min. The onset of melting may be determined and checked to be within 0.5° C. to 0° C.

Polymer samples are pressed into a thin film at an initial temperature of 190° C. (designated as the "initial temperature"). About 5 to 8 mg of sample is weighed out and placed in the DSC pan. The lid is crimped on the pan to ensure a closed atmosphere. The DSC pan is placed in the DSC cell and then heated at a rate of about 100° C./min to a temperature ($T_o$) of about 60° C. above the melt temperature of the sample. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. Enthalpy curves resulting from this experiment are analyzed for peak melt temperature, onset and peak crystallization temperatures, heat of fusion and heat of crystallization, and any other DSC analyses of interest.

Percent crystallinity by weight is calculated according to the following formula:

$$\text{Crystallinity(wt. \%)} = \frac{\Delta H}{\Delta H_o} \times 100\%$$

such that the heat of fusion ($\Delta H$) is divided by the heat of fusion for the perfect polymer crystal ($\Delta H_o$) and then multiplied by 100%. For ethylene crystallinity, $\Delta H_o$ is taken to be 290 J/g. For example, an ethylene-octene copolymer which upon melting of its polyethylene crystallinity is measured to have a heat of fusion of 29 J/g; the corresponding crystallinity is 10% by weight. For propylene crystallinity, $\Delta H_o$ is taken to be 165 J/g. For example, a propylene-ethylene copolymer which upon melting of its propylene crystallinity is measured to have a heat of fusion of 20 J/g; the corresponding crystallinity is 12.1% by weight.

As used herein, the term "non-crosslinked" refers to polymers that have between 0-10% gel, more preferably, 0-5%, and more preferably 0-1%. It should not be construed that absolutely zero crosslinking is present, as some crosslinking may inevitably occur during processing, but that the crosslinking should be kept to a minimum to allow for recyclability.

Polyolefin Compound

In one aspect, embodiments disclosed herein relate to a polyolefin compound having sufficient adhesion to a substrate required for various applications. In another aspect, embodiments disclosed herein relate to a polyolefin compound having sufficient adhesion and shock absorption properties useful in footwear applications. In yet another aspect, embodiments disclosed herein relate to a method of producing polyolefin compounds and various composites using those compounds, having sufficient adhesion and shock absorption properties.

The polyolefin compounds disclosed herein may contain polyolefin elastomers (POE) that possess good shock absorbing characteristics. However, POE's alone typically do not possess adequate adhesion or mechanical strength required for use in footwear applications. To enhance various performance characteristics, POE's may be compounded by blending other polymers, additives, and fillers. For example, POE's, such as ENGAGE™, VERSIFY™, and olefin block copolymers, such as described in U.S. Pat. No. 7,355,089, which is incorporated herein by reference, may be blended with hard polyolefins for mechanical strength, for example, polypropylene (PP) or high-density polyethylene (HDPE), and with polar functional polymers for adhesion, for example, ethylene vinyl acetate (EVA) or an amine or maleic anhydride grafted polyolefin. However, such compounds must account for material compatibility issues that may arise.

Certain blend formulations containing POE's and EVA, or POE's, EVA and other polyolefins have been found to have acceptable compatibility and adhesion properties for use in the low- to mid-end performance applications, for example, in molded footwear applications. For example, a POE blend formulation containing 40 weight percent POE, 15 weight percent PP homopolymer, and 45 weight percent EVA (having a VA content of 28 weight percent in the EVA), demonstrated sufficient adhesion, as the EVA was in the continuous phase. In contrast, a POE blend formulation containing 40 weight percent POE, 15 weight percent HDPE homopolymer, and 45 weight percent EVA (having a VA content of 28 weight percent in the EVA), was found to have poor adhesion, as the EVA was in the dispersed phase.

In general, the polyolefin compounds disclosed herein may include a POE, for example, a thermoplastic olefin copolymer, and at least one functional polymer. In some embodiments, the polyolefin compounds may also include at least one thermoplastic olefin homopolymer. In other embodiments, the polyolefin compounds may also include at least one additive or filler compound.

More specifically, a thermoplastic olefin copolymer may be used to provide good shock absorption properties. A polar functional polymer may be added to promote good compatibility and adhesion between layers in a substrate. A thermoplastic olefin homopolymer may be added to improve hardness and mechanical strength. Fillers may also be added to the compound to modify certain physical or aesthetic properties of the compound.

More specifically, the polyolefin compounds according to the embodiments disclosed herein may include at least one functional polymer having good polarity to promote material compatibility within the blend and to enhance adhesion properties of the blend.

In order to ensure good adhesion properties, the functional polymer must be a part of the continuous phase within the blend. For example, in some embodiments of a two-component blend, the thermoplastic olefin copolymer and the functional polymer may form a continuous phase with no dispersed phase. In other embodiments of three or more component blends, all components may form a continuous phase. Alternatively, in other embodiments of three or more component blends, the thermoplastic olefin copolymer and the functional polymer may form a continuous phase, while other blend components may form one or more dispersed phases.

The polyolefin compounds disclosed herein may have an I2 melt index between about 0.5 and 15, as measured by ASTM D1238. In some embodiments, the polyolefin compounds may have an I2 value between about 1 and 6. In other embodiments, the polyolefin compounds may have an I2 value between about 1 and 5. In yet other embodiments, the polyolefin compounds may have an I2 value between about 1 and 4; and between about 1 and 2.5 in yet other embodiments.

The polyolefin compounds disclosed herein may have a Shore A hardness within the range from about 55 to about 100 as measured by ASTM D2240. In some embodiments, the polyolefin compounds may have a Shore A hardness value within the range from about 70 to about 100; from about 75 to about 95 in yet other embodiments. In other embodiments, the polyolefin compounds may have a Shore A hardness value of between about 80 and 90.

The polyolefin compounds disclosed herein may have a flexural modulus within the range from about 0.8 to about 30 kpsi as measured by ASTM D790. In some embodiments, the polyolefin compounds may have a flexural modulus within the range from about 3 to about 25 kpsi. In other embodiments, the polyolefin compounds may have a flexural modulus within the range from about 3 to about 15 kpsi.

The polyolefin compounds disclosed herein may be manufactured to produce various composites using injection molded, blow molded, extruded, thermoformed, stamped, or otherwise processed.

In some embodiments, the polyolefin compounds disclosed herein may be used in various footwear applications. In other embodiments, the polyolefin compounds disclosed herein may also be used in other applications, for example, flooring, artificial turf, and car bumper manufacturing.

As mentioned above, the polyolefin compounds disclosed herein may contain various components. Each of these components is discussed in more detail below.

Polyolefin Elastomers and Thermoplastic Olefin Copolymers

The thermoplastic polymers used to form the shock absorbing layer may vary depending upon the particular application and the desired result. In one embodiment, for instance, the polymer is an olefin polymer. As used herein, an olefin polymer, in general, refers to a class of polymers formed from hydrocarbon monomers having the general formula $C_nH_{2n}$. The olefin polymer may be present as a copolymer, such as an interpolymer, a block copolymer, or a multi-block interpolymer or copolymer.

In one particular embodiment, for instance, the olefin polymer may comprise an alpha-olefin interpolymer of ethylene with at least one comonomer selected from the group consisting of a $C_3$-$C_{20}$ linear, branched or cyclic diene, and a compound represented by the formula $H_2C{=}CHR$ wherein R is a $C_1$-$C_{20}$ linear, branched or cyclic alkyl group or a $C_6$-$C_{20}$ aryl group. Examples of comonomers include propylene, 1-butene, 3-methyl-1-butene, 4-methyl-1-pentene, 3-methyl-1-pentene, 1-heptene, 1-hexene, 1-octene, 1-decene, and 1-dodecene.

In other embodiments, the polymer may be an alpha-olefin interpolymer of propylene with at least one comonomer selected from the group consisting of ethylene, a $C_4$-$C_{20}$ linear, branched or cyclic diene, and a compound represented by the formula $H_2C{=}CHR$ wherein R is a $C_1$-$C_{20}$ linear, branched or cyclic alkyl group or a $C_6$-$C_{20}$ aryl group. Examples of comonomers include ethylene, 1-butene, 3-methyl-1-butene, 4-methyl-1-pentene, 3-methyl-1-pentene, 1-heptene, 1-hexene, 1-octene, 1-decene, and 1-dodecene. In some embodiments, the comonomer is present at about 5% by weight to about 25% by weight of the interpolymer. In one embodiment, a propylene-ethylene interpolymer is used.

Other examples of polymers which may be used in the present disclosure include homopolymers and copolymers (including elastomers) of an olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; styrenic copolymers (including elastomers) such as polystyrene, ABS, acrylonitrile-styrene copolymer, methylstyrene-styrene copolymer; and styrene block copolymers (including elastomers) such as styrene-butadiene copolymer and hydrate thereof, and styrene-isoprene-styrene triblock copolymer; and the like. These resins may be used either alone or in combinations of two or more.

In particular embodiments, polyolefins such as polypropylene, polyethylene, and copolymers thereof and blends thereof, as well as ethylene-propylene-diene terpolymers may be used. In other particular embodiments, $C_2$ to $C_8$ olefin polymers, copolymers, and blends may be used. For example, a propylene-ethylene copolymer based elastomer, such as VERSIFY™, or an ethylene-butene or and ethylene-octene based elastomer, such as ENGAGE™ and other olefin block copolymers, such as described in U.S. Pat. No. 7,355,089, may be used.

In some embodiments, the olefinic polymers include homogeneous polymers described in U.S. Pat. No. 3,645,992 by Elston; high density polyethylene (HDPE) as described in U.S. Pat. No. 4,076,698 to Anderson; heterogeneously branched linear low density polyethylene (LLDPE); heterogeneously branched ultra low linear density (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosure of which process is incorporated herein by reference; heterogeneously branched linear ethylene/alpha olefin polymers; and high pressure, free radical polymerized ethylene polymers and copolymers such as low density polyethylene (LDPE).

Exemplary polymers include polypropylene (such as impact modifying polypropylene, isotactic polypropylene, atactic polypropylene, and random ethylene/propylene copolymers), various types of polyethylene, including high pressure, free-radical LDPE, Ziegler Natta LLDPE, metallocene PE, including multiple reactor PE ("in reactor") blends of Ziegler-Natta PE and metallocene PE, such as products disclosed in U.S. Pat. Nos. 6,545,088, 6,538,070, 6,566,446, 5,844,045, 5,869,575, and 6,448,341. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil) may also be useful in some embodiments. Of course, blends of polymers may be used as well. In some embodiments, the blends include two different Ziegler-Natta polymers. In other embodiments, the blends may include blends of a Ziegler-Natta and a metallocene polymer. In still other embodiments, the thermoplastic resin used herein may be a blend of two different metallocene polymers.

In one particular embodiment, the polymer may comprise an alpha-olefin interpolymer of ethylene with a comonomer comprising an alkene, such as 1-octene. The ethylene and octene copolymer may be present alone or in combination with another polymer, such as ethylene-acrylic acid copolymer. The polymer, such as the ethylene-octene copolymer, may have a crystallinity of less than about 50 percent, such as less than about 25 percent. In some embodiments, the crystallinity of the polymer may be from 5 to 35 percent. In other embodiments, the crystallinity may range from 7 to 20 percent.

In one particular embodiment, the polymer may comprise an alpha-olefin interpolymer of ethylene with a comonomer comprising an alkene, such as 1-octene. The ethylene and octene copolymer may be present alone or in combination with at least two other polymers from the group: low density polyethylene, medium density polyethylene, and high density polyethylene (HDPE).

Embodiments disclosed herein may also include a polymeric component that may include at least one multi-block olefin interpolymer. Suitable multi-block olefin interpolymers may include those described in U.S. Patent Application Publication No. 2008-0009586 A1, for example. The term "multi-block copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or $M_w/M_n$), block length distribution, and/or block number distribution due to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1.0 to about 2.9; from about 1.3 to about 2.5 in other embodiments; from about 1.4 to about 2.0 in other embodiments; and from about 1.4 to about 1.8 in yet other embodiments.

One example of the multi-block olefin interpolymer is an ethylene/α-olefin block interpolymer. Another example of the multi-block olefin interpolymer is a propylene/α-olefin interpolymer. The following description focuses on the interpolymer as having ethylene as the majority monomer, but applies in a similar fashion to propylene-based multi-block interpolymers with regard to general polymer characteristics.

The ethylene/α-olefin multi-block interpolymers may comprise ethylene and one or more co-polymerizable α-olefin comonomers in polymerized form, characterized by multiple (i.e., two or more) blocks or segments of two or more polymerized monomer units differing in chemical or physical properties (block interpolymer), preferably a multi-block interpolymer. In some embodiments, the multi-block interpolymer may be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

*AAA-AA-BBB-BB*

In other embodiments, the block copolymers do not have a third block. In still other embodiments, neither block A nor block B comprises two or more segments (or sub-blocks), such as a tip segment.

The multi-block interpolymers may be characterized by an average block index, ABI, ranging from greater than zero to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the $i^{th}$ fraction of the multi-block interpolymer obtained in preparative TREF, and $w_i$ is the weight percentage of the $i^{th}$ fraction.

Similarly, the square root of the second moment about the mean, hereinafter referred to as the second moment weight average block index, may be defined as follows:

$$2^{nd} \text{ moment weight average } BI = \sqrt{\frac{\Sigma(w_i(BI_i - ABI)^2)}{\frac{(N-1)\Sigma w_i}{N}}}$$

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the analytical temperature rising elution fractionation (ATREF) elution temperature for the $i^{th}$ fraction (preferably expressed in Kelvin), $P_X$ is the ethylene mole fraction for the $i^{th}$ fraction, which may be measured by NMR or IR as described below. $P_{AB}$ is the ethylene mole fraction of the whole ethylene/α-olefin interpolymer (before fractionation), which also may be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the multi-block interpolymer. $T_{AB}$ may be calculated from the mole fraction of ethylene (measured by NMR) using the following equation:

$$LnP_{AB} = \alpha/T_{AB} + \beta$$

where α and β are two constants which may be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$LnP = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition and having an ethylene mole fraction of $P_X$. $T_{XO}$ may be calculated from $LnP_X = \alpha/T_{XO} + \beta$. Conversely, $P_{XO}$ is the ethylene mole fraction for a random copolymer of the same composition and having an ATREF temperature of $T_X$, which may be calculated from $Ln P_{XO} = \alpha/T_X + \beta$.

Once the block index (BI) for each preparative TREF fraction is obtained, the weight average block index, ABI, for the whole polymer may be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the multi-block interpolymer is that the interpolymer may comprise at least one polymer fraction which may be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

Ethylene α-olefin multi-block interpolymers used in embodiments of the invention may be interpolymers of ethylene with at least one $C_3$-$C_{20}$ α-olefin. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or non-conjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (such as cyclopentene, cyclohexene, and cyclooctene, for example).

The multi-block interpolymers disclosed herein may be differentiated from conventional, random copolymers, physical blends of polymers, and block copolymers prepared via sequential monomer addition, fluxional catalysts, and anionic or cationic living polymerization techniques. In particular, compared to a random copolymer of the same monomers and monomer content at equivalent crystallinity or modulus, the interpolymers have better (higher) heat resistance as measured by melting point, higher TMA penetration temperature, higher high-temperature tensile strength, and/or higher high-temperature torsion storage modulus as determined by dynamic mechanical analysis. Properties of shock absorbing layers may benefit from the use of embodiments of the multi-block interpolymers, as compared to a random copolymer containing the same monomers and monomer content, the multi-block interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

Other olefin interpolymers include polymers comprising monovinylidene aromatic monomers including styrene, o-methyl styrene, p-methyl styrene, t-butylstyrene, and the like. In particular, interpolymers comprising ethylene and styrene may be used. In other embodiments, copolymers comprising ethylene, styrene and a $C_3$-$C_{20}$ α olefin, optionally comprising a $C_4$-$C_{20}$ diene, may be used.

Suitable non-conjugated diene monomers may include straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyrcene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD).

One class of desirable polymers that may be used in accordance with embodiments disclosed herein includes elastomeric interpolymers of ethylene, a $C_3$-$C_{20}$ α-olefin, especially propylene, and optionally one or more diene monomers. Preferred α-olefins for use in this embodiment are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Thermoplastic olefin polymers (homopolymers, copolymers, interpolymers and multi-block interpolymers) described herein may have a melt index, $I_2$, from 0.01 to 2000 g/10 minutes in some embodiments; from 0.01 to 1000 g/10 minutes in other embodiments; from 0.01 to 500 g/10 minutes in other embodiments; and from 0.01 to 100 g/10 minutes in yet other embodiments. In certain embodiments, the polyolefins may have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the polyolefins may be approximately 1 g/10 minutes, 3 g/10 minutes or 5 g/10 minutes. In other embodiments, the polyolefins may have a melt index greater than 20 dg/min; greater than 40 dg/min in other embodiments; and greater than 60 dg/min in yet other embodiments.

The thermoplastic olefin polymers and oligomers described herein may have molecular weights, $M_2$, from 1,000 g/mole to 5,000,000 g/mole in some embodiments; from 1000 g/mole to 1,000,000 in other embodiments; from 10,000 g/mole to 500,000 g/mole in other embodiments; and from 10,000 g/mole to 300,000 g/mole in yet other embodiments. The density of the polyolefins described herein may be from 0.80 to 0.99 g/cm³ in some embodiments; from 0.85 g/cm³ to 0.97 g/cm³ for other embodiments; and between 0.87 g/cm³ and 0.94 g/cm³ in yet other embodiments.

In some embodiments, the thermoplastic olefin polymers described herein may have a tensile strength above 10 MPa; a tensile strength≧11 MPa in other embodiments; and a tensile strength≧13 MPa in yet other embodiments. In some embodiments, the polyolefins described herein may have an elongation at break of at least 600 percent at a crosshead separation rate of 11 cm/minute; at least 700 percent in other embodiments; at least 800 percent in other embodiments; and at least 900 percent in yet other embodiments.

In some embodiments, the thermoplastic olefin polymers described herein may have a storage modulus ratio, G'(25° C.)/G'(100° C.), from 1 to 50; from 1 to 20 in other embodiments; and from 1 to 10 in yet other embodiments. In some embodiments, the polyolefins may have a 70° C. compression set of less than 80 percent; less than 70 percent in other embodiments; less than 60 percent in other embodiments; and, less than 50 percent, less than 40 percent, down to a compression set of 0 percent in yet other embodiments.

In some embodiments, the ethylene/α-olefin interpolymers may have a heat of fusion of less than 85 J/g. In other embodiments, the ethylene/α-olefin interpolymer may have a pellet blocking strength of equal to or less than 100 pounds/foot$^2$ (4800 Pa); equal to or less than 50 lbs/ft$^2$ (2400 Pa) in other embodiments; equal to or less than 5 lbs/ft$^2$ (240 Pa), and as low as 0 lbs/ft$^2$ (0 Pa) in yet other embodiments.

In some embodiments, block polymers made with two catalysts incorporating differing quantities of comonomer may have a weight ratio of blocks formed thereby ranging from 95:5 to 5:95. The elastomeric interpolymers, in some embodiments, have an ethylene content of from 20 to 90 percent, a diene content of from 0.1 to 10 percent, and an α-olefin content of from 10 to 80 percent, based on the total weight of the polymer. In other embodiments, the multi-block elastomeric polymers have an ethylene content of from 60 to 90 percent, a diene content of from 0.1 to 10 percent, and an α-olefin content of from 10 to 40 percent, based on the total weight of the polymer. In other embodiments, the interpolymer may have a Mooney viscosity (ML (1+4) 125° C.) ranging from 1 to 250. In other embodiments, such polymers may have an ethylene content from 65 to 75 percent, a diene content from 0 to 6 percent, and an α-olefin content from 20 to 35 percent.

In certain embodiments, the thermoplastic olefin polymer may be a propylene-ethylene interpolymer having an ethylene content between 5 and 20% by weight and a melt flow rate (230° C. with 2.16 kg weight) from 0.5 to 300 g/10 min. In other embodiments, the propylene-ethylene copolymer or interpolymer may have an ethylene content between 9 and 12% by weight and a melt flow rate (230° C. with 2.16 kg weight) from 1 to 100 g/10 min.

In some particular embodiments, the thermoplastic olefin polymer is a propylene-based copolymer or interpolymer. In some embodiments, a propylene/ethylene copolymer or interpolymer is characterized as having substantially isotactic propylene sequences. The term "substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra. In other particular embodiments, the ethylene-α olefin copolymer may be ethylene-butene, ethylene-hexene, or ethylene-octene copolymers or interpolymers. In other particular embodiments, the propylene-α olefin copolymer may be a propylene-ethylene or a propylene-ethylene-butene copolymer or interpolymer.

The thermoplastic olefin polymers described herein (homopolymers, copolymers, interpolymers, multi-block interpolymers) may be produced using a single site catalyst and may have a weight average molecular weight of from about 15,000 to about 5 million, such as from about 20,000 to about 1 million. The molecular weight distribution of the polyolefins may be from about 1.01 to about 80, such as from about 1.5 to about 40, such as from about 1.8 to about 20.

In some embodiments, polyolefin compounds according to embodiments disclosed herein may include at least one thermoplastic olefin copolymer or POE. As previously described, thermoplastic olefin copolymers may include block, graft, random, or alternating copolymers. In general, the thermoplastic olefin copolymer may include a $C_2$ to $C_3$ olefins and a $C_2$ to $C_8$ α-olefin. In some specific embodiments, the thermoplastic olefin copolymer may be a propylene-ethylene copolymer. In other specific embodiments, the thermoplastic olefin copolymer may be an ethylene-butene or an ethylene-octene copolymer. In yet other embodiments, the thermoplastic olefin may include ethylene-alpha olefin and propylene-alpha olefins having long chain branching, such as, for example, those described in U.S. Provisional Patent Application No. 60/988,999, filed Nov. 19, 2007, which is incorporated herein by reference.

In some embodiments, the composition of the thermoplastic olefin copolymer in the polyolefin compound may range from about 30 to about 90 weight percent. In other embodiments, the composition of the thermoplastic olefin copolymer in the polyolefin compound blend may range from about 30 to about 45 weight percent. In yet other embodiments, the composition of the thermoplastic olefin copolymer in the polyolefin compound blend may range from about 30 to about 55 weight percent. In yet other embodiments, the composition of the thermoplastic olefin copolymer in the polyolefin compound blend may range from about 30 to about 70 weight percent.

Functional Polymer

In some embodiments, functional polymers useful in the polyolefin compounds disclosed herein may include EVA. In some specific embodiments, a VA content of the EVA may be at least 28 weight percent. In other specific embodiments, the VA content of the EVA may be at least 40 weight percent. In yet other specific embodiments, the VA content of EVA may be at least 60 weight percent. In other embodiments, the functional polymer may include a maleic anhydride, an amine, or a hydroxyl grafted polymer. In some specific embodiments, the maleic anhydride, the amine, or the hydroxyl in the functional polymer may be grafted onto an olefin homopolymer, for example, PP or HDPE. In other specific embodiments, the maleic anhydride, the amine, or the hydroxyl in the functional polymer may be grafted onto an olefin copolymer, such as those described above under the heading "Polyolefin Elastomers and Thermoplastic Olefin Copolymers." One ordinarily skilled in the art would recognize that other functionalized polymers may also be used.

The amount of the functional group present in the functional polymer may vary. The functional group may be present in an amount of at least about 1.0 weight percent in some embodiments; at least about 5 weight percent in other embodiments; and at least about 7 weight percent in yet other embodiments. The functional group may be present in an amount less than about 40 weight percent in some embodiments; less than about 30 weight percent in other embodiments; less than about 25 weight percent in other embodiments; and less than about 15 weight percent in yet other embodiments.

Olefin polymers, copolymers, interpolymers, and multi-block interpolymers may be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. In a family of embodiments, functional groups may include maleic anhydride, an amine, or a hydroxyl. Such functional groups may be grafted to an olefin polymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of which are incorporated herein by reference in their entirety. One particularly useful functional group is maleic anhydride. In yet other embodiments, the functional polymer may include an ethylene-vinyl acetate-maleic anhydride terpolymer.

In some embodiments, a high amount of functional polymer may be required to maintain the functional polymer in the continuous phase. For example, as stated above, some specific embodiments may require an EVA content of approximately 40 weight percent, the EVA having at least approximately 28 weight percent VA content, in order to ensure that the functional polymer is in the continuous phase. In other embodiments, the functional polymer content of less than 40 weight percent may be sufficient in order to ensure that the functional polymer is in the continuous phase.

In some embodiments, the composition of the functional polymer in the polyolefin compound may be within the range from about 1 to about 75 weight percent. In other embodiments, composition of the functional polymer in the polyolefin compound may be within the range from about 1 to about 50 weight percent. In yet other embodiments, composition of the functional polymer in the polyolefin compound may be within the range from about 1 to about 35 weight percent.

Olefin Homopolymer or Copolymer

In some embodiments, an optional olefin homopolymer or copolymer may also be included in the polyolefin compound. In some embodiments, an olefin homopolymer or copolymer may form a dispersed phase within the polyolefin compound. In other embodiments, the olefin homopolymer or copolymer may be a part of the continuous phase within the polyolefin compound.

In some embodiments, the composition of the olefin homopolymer in the polyolefin compound may be as high as approximately 30 weight percent. In one specific embodiment, the composition of the olefin homopolymer in the polyolefin compound may be within the range from about 0 to about 30 weight percent. In other specific embodiments, the composition of the olefin homopolymer in the polyolefin compound may be within the range from greater than 0 to about 30 weight percent. In yet other specific embodiments, the composition of the olefin homopolymer in the polyolefin compound may be within the range from about 5 to about 30 weight percent. In other specific embodiments, the composition of the olefin homopolymer in the polyolefin compound may be within the range from about 10 to about 20 weight percent. In other specific embodiments, the composition of the olefin homopolymer in the polyolefin compound may be within the range from about 12 to about 15 weight percent.

In some embodiments, the composition of the olefin copolymer in the polyolefin compound may be as high as approximately 30 weight percent. In one specific embodiment, the composition of the olefin copolymer in the polyolefin compound may be within the range from about 0 to about 30 weight percent. In other specific embodiments, the composition of the olefin copolymer in the polyolefin compound may be within the range from greater than 0 to about 30 weight percent. In yet other specific embodiments, the composition of the olefin copolymer in the polyolefin compound may be within the range from about 5 to about 30 weight percent. In other specific embodiments, the composition of the olefin copolymer in the polyolefin compound may be within the range from about 10 to about 20 weight percent. In other specific embodiments, the composition of the olefin copolymer in the polyolefin compound may be within the range from about 12 to about 15 weight percent.

In some embodiments, the olefin homopolymer may include at least one $C_2$ to $C_8$ α-olefin homopolymers. In other embodiments, the olefin homopolymer may include at least one of PP and HDPE.

Fillers and Additives

In some embodiments, an optional filler or additive may also be included in the polyolefin compound. In general, fillers and additives may be polymer or non-polymer materials that modify certain physical or aesthetic properties of the blend or compound. For example, blends may contain fillers and additives, including but not limited to: plasticizers; light and heat stabilizers; anti-oxidants; acid scavengers; oils (such as paraffinic); flame retardants; colorants; surface texture modifiers; processing and extrusion aids, such as mold release agents; and structural reinforcement materials, such as glass fibers to make fiber reinforced plastics (FRP's).

These optional ingredients may include, but are not limited to: talc, calcium carbonate, titanium dioxide powder, polymer particles, hollow glass spheres, polymeric fibers such as polyolefin based staple monofilaments and the like. In one specific embodiment, talc or calcium carbonate may be added as filler to the polyolefin compound to improve handling due to inherent tackiness. One skilled in the art would recognize that other fillers, additives, and modifiers may also be added to the polyolefin compounds according to embodiments described herein.

The content of the filler materials in the polyolefin compounds according to embodiments disclosed herein may vary, depending on the specific application for which they are designed, ranging from approximately greater than 0 to 10 weight percent (dry basis) of the weight of the polymer blend. In some embodiments, the filler content in the polyolefin compounds may be within the range from greater than 0 to about 5 weight percent (dry basis) of the weight of the polymer blend.

Polyolefin Compound Properties

The properties of the polyolefin compound, including blended compounds, according to embodiments disclosed herein may vary depending on the type and the relative compositions of the blend components. Further, the polyolefin compound properties may be custom designed depending upon the specific shock absorbing applications. In general, the polyolefin compound for manufacturing shock absorbing layers, for example, for footwear applications, must possess good mechanical, shock absorption, adhesion, and optical properties.

In some embodiments, a Shore A hardness of the polyolefin compound may be within the range from about 20, preferably 50 to about 100 as measured using ASTM D2240. In other embodiments, the Shore A hardness of the polyolefin compound may be within the range from about 70 to about 100 psi as measured using ASTM D2240. In other embodiments, a Shore D hardness of the polyolefin compound may be between 30 to 65.

In some embodiments, a melt index of the polyolefin compound may be within the range from about 0.5 to about 10, as measured using ASTM D1238. In other embodiments, the melt index of the polyolefin compound may be within the range from about 1 to about 6, as measured using ASTM D1238.

In some embodiments, a flexural modulus of the polyolefin compound may be within the range from about 1 to about 50 kpsi as measured using ASTM D790. In other embodiments, the flexural modulus of the polyolefin compound may be within the range from about 3 to about 30 kpsi as measured using ASTM D790.

In some embodiments, a clarity of the polyolefin compound may be within the range from abut 1 to about 95 percent as measured using ASTM D1746. In other embodiments, the clarity of the polyolefin compound may be within the range from about 5 to about 85 percent as measured using ASTM D1746.

In some embodiments, a density of the polyolefin compound may be between approximately 0.8 and 1 g/cm$^3$ using ASTM D792. In other embodiments, the density of the polyolefin compound may be between approximately 0.87 and 0.95 g/cm$^3$ using ASTM D792.

Processing Methods

A variety of processing methods may be used to manufacture the shock absorbing layers according to embodiments disclosed herein. The selection of a specific method may depend on the application, the type of polymer material or blend being used, and the desired shape or configuration of the final product. In general, the manufacturing of shock absorbing layers may include, but not necessarily be limited to, such methods and techniques as: thermoforming, stamping, melt extrusion, injection molding, and blow molding. One ordinarily skilled in the art would recognize that other processing methods may also be used.

In some embodiments, the shock absorbing material described herein may be formed by a pressurized melt processing method, such as extrusion or injection molding. In some embodiments, an extruder may include: a hopper for feeding one or more raw polymers into a barrel, one or more screw injectors for moving the raw polymer through the barrel, a feedpipe, and a die with an orifice. In other embodiments, the extruder may be a tandem system, a single screw extruder, a twin screw extruder, etc. In other embodiments, the extruder may be equipped with multilayer annular dies, flat film dies and feedblocks, multi-layer feedblocks such as those disclosed in U.S. Pat. No. 4,908,278 (Bland et al.), multi-vaned or multi-manifold dies such as a 3-layer vane die available from Cloeren, Orange, Tex.

In other embodiments, an injection molding device may include a hopper for feeding the raw plastic pellets in to a barrel. The plastic may be melted in the barrel and, with the help of one or more screws (pistons), injected into a mold. Upon entering the mold, the molten plastic may be rapidly cooled and solidified, assuming the shape of a mold cavity. Once the part is sufficiently solidified, the mold may be opened and the part ejected out of the mold.

In some specific embodiments, the injection mold may have a sprue for feeding the molten plastic resin inside the front plate, one or more runners for channeling the plastic melt to one or more cavities through one or more specialized gates. Inside each cavity, the molten resin may flow around cores, or protrusions, in order to conform to the shape of each cavity to form the desired part.

Applications

Polyolefin compounds according to embodiments disclosed herein may be used in composites having at least one shock absorbing layer. For example, the polyolefin compound composite may be used in various applications, such as footwear, artificial turf and flooring, and car bumpers. The shock absorbing layer may be manufactured using several different methods, for example, injection molding. Due to the layering nature of many shock absorbing applications, the polyolefin compound composite must possess sufficient adhesion to a polyolefin or a non-polyolefin substrate.

In some applications, the shock absorbing layers made from a polyolefin compound according to embodiments disclosed herein may be used to make shoe composites. For example, the purpose of a shock absorber in a shoe composite may be to soften the impact stress on the foot while walking, running, or jumping. A typical shoe composite may include a sole and an upper for stabilizing the foot with respect to the shoe sole. The shoe sole may include at least one of: an insole, a midsole, and an outsole. The shock absorbing layer is typically a part of the shoe sole, commonly referred to as a midsole. To make the shoe composite, the shock absorbing midsole may be attached to at least one of the outsole, the insole, and the upper.

In other applications, the shock absorbing layers made from a polyolefin composite according to embodiments disclosed herein may be used to make artificial turf or flooring composites. More specifically, shock absorbing layers may be used in various sporting event turfs and surfaces, such as an artificial turf for a soccer field. For example, the purpose of a shock absorbing layer in an artificial turf or a flooring composite may be to increase the sport performance; to enhance athlete comfort in walking, running, or jumping activities; and to potentially prevent serious injuries by softening the impact from a fall.

In yet other applications, the shock absorbing layers made from a polyolefin composite according to embodiments disclosed herein may be used in car bumper applications. For example, the purpose of a shock absorbing layer in a car bumper may be to soften the effects of an impact collision of a vehicle in order to protect the driver and the passengers.

EXAMPLES

The usefulness of polyolefin compounds according to embodiments disclosed herein is investigated. Specifically, a number of POE compound formulations having two or three components are studied. The polyolefin compounds investigated include compositions according to the formulations shown in Table 1 (values given in weight percent). The polyolefin compounds are formed by compounding or blending the constituent polymers. For example, compounding may be accomplished using a melt extruder, where two or more polymers are fed to an extruder barrel, where they are molten, mixed, and propagated along the barrel by single or twin injection screws, and further extruded through a dye. In some embodiments, a cylindrical orifice dye may be used to produce polymer extrudate in form of long "spaghetti-like" polymer strands that may further chopped and pelletized.

Two-component and three-component polyolefin compounds, Samples 1-11, are formulated as illustrated in Table 1, and are each analyzed for various thermal, rheological, mechanical, dynamic, optical, and other material properties. In the two-component polyolefin compounds, Samples 2-4 and 10-11, one component is a thermoplastic olefin copolymer or block copolymer and another component is a polar functional polymer, such as ethylene vinyl acetate (EVA) or a graft amine or maleic anhydride. In the three-component polyolefin compounds, Samples 5-9, the third component is hard olefin homopolymer, such as polypropylene (PP) or high density polyethylene (HDPE). In Tables 2A-B below, various thermal, mechanical, rheological, and optical properties of the two and three component compounds are examined.

As listed in Table 1, olefin block copolymer OBC1 is a high elasticity olefin block copolymer having a melt index I2 of 0.5 g/10 minutes, a density of 0.877 g/cc, a DSC melting point of 120° C., and a Compression set at 21° C. (ASTM D 395) of 15%; POE1 is a polyolefin elastomer copolymer having a melt index I2 of 0.8 g/10 minutes, a density of 0.880 g/cc, a DSC melting point of 64° C., and a Mooney Viscosity (ML 1+4 at 121° C., ASTM D 1646) of 24; POE2 is an elastomeric propylene copolymer having a melt flow rate (MFR, 230° C., 2.16 kg, ASTM D 1238) of 8 g/10 minutes, a density of 0.888 g/cc, a Vicat Softening Point (ASTM D 1525) of 98° C., and a total crystallinity of 44%; POE3 is an elastomeric propylene copolymer having a melt flow rate (MFR, defined as above) of 8 g/10 minutes, a density of 0.876 g/cc and a Vicat Softening Point (ASTM D 1525) of 64° C.; PP1 is an injection grade heterophasic propylene copolymer having a melt flow rate (MFR) of 7 g/10 minutes; PP2 is a propylene random copolymer having a melt flow rate (MFR) of 1.9 g/10 minutes, a density of 0.9 g/cc; EVA1 is an ethylene-vinyl acetate copolymer, 28% vinyl acetate, having a density of 0.949 g/cc and a melt index I2 of 6.6 g/10 minutes.

TABLE 1

| # | OBC1 | EVA1 | POE1 | PP1 | PP2 | POE2 | POE3 |
|---|------|------|------|-----|-----|------|------|
| 1 | 100 | | | | | | |
| 2 | 70 | 30 | | | | | |
| 3 | 50 | 50 | | | | | |
| 4 | 30 | 70 | | | | | |
| 5 | | 45 | 40 | 15 | | | |
| 6 | | 45 | | | 15 | 40 | |
| 7 | 40 | 45 | | | 15 | | |
| 8 | 40 | 45 | | 15 | | | |
| 9 | | 45 | | | 5 | 50 | |
| 10 | | 45 | | | | 55 | |
| 11 | | 45 | | | | | 55 |

The polyolefin compounds as described in Table 1 are then formed into test specimens, as appropriate, and analyzed for thermal, rheological, mechanical, dynamic, optical, and other material properties.

The Melt Index (I2) is measured according to ASTM D1238, as previously described. The Melt Index (I10) is measured according to ASTM D1238, using a 10 kg weight at 190° C. The Percent Crystallinity, the Melting Point Temperature, the Glass Transition Temperature, the Crystallization Temperature, and the Heat of Melting measurements can be performed using the Differential Scanning calorimetry (DCS) testing method as also previously described. Shore A hardness is measured according to ASTM D2240 as described above. Density is measured according to ASTM D792 as described above. Clarity is measured according to ASTM D1746 as described above. Flexural modulus and flexural strength are measured on an Instron according to ASTM D790 as described above.

Compression Set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

Dynamic Mechanical Spectroscopy (DMS) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing. A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime. An initial static force of 10 g is maintained (autotension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

The total haze as well as the internal haze of the mono and multilayer coextruded films is measured on a BYK Gardner Haze-gard based on ASTM D 1003 Procedure A. For the measurement of internal haze, mineral oil is applied to the film surface to minimize the contribution arising from the roughness on the film surface.

TABLE 2A

| # | I2, g/10 min @ 190 C. | I10, g/10 min @ 190 C. | Shore A @ 5 sec | Comp Set @ 70 C. | TMA penetration @ 1 mm, C. | Tg, C. | Tm, C. | Tc, C. | ΔH melt, J/g | % Wt Crystal |
|---|---|---|---|---|---|---|---|---|---|---|
| 1 | 0.6 | 4 | 75 | 36 | 105 | −63 | 120 | 104 | 48 | 16 |
| 2 | 1.0 | 11 | 77 | 49 | 88 | −63 | 120 | 103 | 58 | 20 |
| 3 | 2.0 | 23 | 78 | 93 | 72 | −62 | 119 | 102 | 63 | 22 |
| 4 | 2.5 | 32 | 80 | 100 | 67 | −63 | 119 | 82 | 70 | 24 |
| 5 | 1.8 | 25 | 85 | 100 | 70 | −32 | 66 & 164 | 89, 51 | 52, 10 | N/A |
| 6 | 3.7 | 48 | 95 | 88 | 106 | −23 | 73, 109, 145 | 97, 92, 53 | 72 | N/A |
| 7 | 2.0 | 25 | 83 | 89 | 75 | −62 | 73, 120, 144 | 100, 52 | 63 | N/A |
| 8 | 2.3 | 28 | 81 | 96 | 73 | −62 | 72, 120, 165 | 101, 52 | 65 | N/A |
| 9 | 4.2 | 51 | 95 | 88 | 126 | −24 | 74, 109, 126 | 111, 98, 53 | 77 | N/A |

TABLE 2A-continued

| # | I2, g/10 min @ 190 C. | I10, g/10 min @ 190 C. | Shore A @ 5 sec | Comp Set @ 70 C. | TMA penetration @ 1 mm, C. | Tg, C. | Tm, C. | Tc, C. | ΔH melt, J/g | % Wt Crystal |
|---|---|---|---|---|---|---|---|---|---|---|
| 10 | 4.4 | 51 | 94 | 88 | 119 | −24 | 73, 109 | 97, 80, 53 | 76 | N/A |
| 11 | 4.8 | 54 | 92 | 84 | 104 | −26 | 72, 99 | 54 | 54 | N/A |

TABLE 2B

| # | Flex Strength, psi | Flex Modulus, kpsi | Clarity (20 mil, c-molded), % | Internal Clarity (20 mil, c-molded), % | Haze (20 mil, c-molded), % | Internal Haze, % | Transmittance, % | Internal Transmittance, % | Density, g/cc |
|---|---|---|---|---|---|---|---|---|---|
| 1 | 116 | 11 | 10 | 7 | 100 | 100 | 43 | 42 | 0.875 |
| 2 | 106 | 6 | 21 | 15 | 99 | 99 | 44 | 43 | 0.896 |
| 3 | 98 | 6 | 22 | 21 | 98 | 98 | 52 | 51 | 0.913 |
| 4 | 88 | 4 | 73 | 70 | 71 | 65 | 64 | 62 | 0.929 |
| 5 | 132 | 4 | 6 | 5 | 100 | 100 | 74 | 75 | 0.913 |
| 6 | N/A | 26 | 6 | 4 | 100 | 100 | 62 | 64 | 0.918 |
| 7 | N/A | N/A | 7 | 5 | 100 | 100 | 63 | 61 | 0.908 |
| 8 | N/A | N/A | 6 | 4 | 100 | 100 | 52 | 51 | 0.911 |
| 9 | N/A | N/A | 7 | 5 | 98 | 99 | 96 | 89 | 0.918 |
| 10 | N/A | N/A | 7 | 5 | 97 | 99 | 97 | 89 | 0.919 |
| 11 | N/A | N/A | 83 | 74 | 26 | 24 | 98 | 91 | 0.942 |

The results of the various thermal, rheological, mechanical, dynamic, optical, and other material property tests of Samples 1-11 are presented in Tables 2A-B. As evident from Tables 2A-B, various POE compound formulations serve to improve material performance of the compound by altering certain material properties.

For example, the use of thermoplastic olefin copolymer in POE compounds may enhance thermal resistance, as evidenced by the increased TMA penetration. As shown in Table 2A, Samples 1-3 and 9-11 having a thermoplastic olefin copolymer content of at least 50 weight percent demonstrate improved TMA penetration ranging from 88° C. to 126° C., as compared to the TMA values ranging from 67° C. to 75° C. for most other samples having a lower thermoplastic olefin copolymer content.

Further, the use of certain thermoplastic olefin copolymers in POE compounds may improve optical properties. For example, as shown in Table 2B, Samples 9-11 having at least 50 weight percent of certain thermoplastic olefin copolymer demonstrate improved transmittance values ranging from 96 to 98 percent, as compared to transmittance values ranging from 43 to 74 percent for other samples.

Referring to Table 2A, the use of an olefin homopolymer in POE compounds may enhance mechanical properties, such as, for example, Shore A hardness and flexural modulus. As shown in Table 2A, Samples 5-9 containing between 5 and 15 weight percent of olefin homopolymer demonstrate improved Shore A hardness values ranging between 85 and 95, as compared to Shore A hardness values ranging from 75 to 80 for Samples 1-4 that do not contain an olefin homopolymer. Further, Sample 6 containing 15 weight percent of olefin homopolymer demonstrates an improved flexural modulus of 26 kpsi, as compared to flexural modulus values ranging from 4 to 11 kpsi for a number of other samples.

Thus, as illustrated in Tables 2A-B, various material properties may be improved as the result of creating polyolefin compounds according to embodiments described herein.

Referring now to FIGS. 1A-B, 2A-B, and 3A-B, the results of DSC, TMA, and DMS testing of Samples 1-11, corresponding to the values shown in Table 1 above for various polyolefin elastomers according to embodiments disclosed herein are also illustrated.

Polyolefin compounds according to embodiments disclosed herein, Samples 12-23, are formulated as illustrated in Table 3 (values shown are in weight percent), and are each analyzed for adhesive properties. As above, the formulations include at least one thermoplastic olefin copolymer or block copolymer, a polar functional polymer, such as ethylene vinyl acetate (EVA) or a graft amine or maleic anhydride, and an olefin homopolymer, such as polypropylene (PP) or high density polyethylene (HDPE).

TABLE 3

| Sample | POE1 | OBC2 | OBC3 | HDPE1 | POE4 | PP3 | EVA2 | POE-g-MAH | POE-g-AM | OBC-g-AM | EVA3 |
|---|---|---|---|---|---|---|---|---|---|---|---|
| 12 | 65 | — | — | — | — | 15 | — | — | 20 | — | — |
| 13 | 65 | — | — | — | — | 15 | — | — | — | 20 | — |
| 14 | 65 | — | — | — | — | 15 | 20 | — | — | — | — |
| 15 | 65 | — | — | — | — | 15 | 20 | — | — | — | — |
| 16 | 65 | — | — | — | — | 15 | 15 | 5 | — | — | — |
| 17 | — | 65 | — | 20 | — | — | — | — | 15 | — | — |
| 18 | — | — | 55 | 30 | — | — | — | — | 15 | — | — |

TABLE 3-continued

| Sample | POE1 | OBC2 | OBC3 | HDPE1 | POE4 | PP3 | EVA2 | POE-g-MAH | POE-g-AM | OBC-g-AM | EVA3 |
|---|---|---|---|---|---|---|---|---|---|---|---|
| 19 | — | 65 | — | 15 | — | — | 20 | — | — | — | — |
| 20 | — | 65 | — | 15 | — | — | 15 | 5 | — | — | — |
| 21 | — | — | — | — | 45 | 35 | 20 | — | — | — | — |
| 22 | — | — | — | — | 60 | 15 | 20 | 5 | — | — | — |
| 23 | 65 | — | — | — | — | 15 | — | 5 | — | — | 15 |

As listed in Table 1, POE1 is a polyolefin elastomer copolymer having a melt index I2 of 0.8 g/10 minutes, a density of 0.880 g/cc, a DSC melting point of 64° C., and a Mooney Viscosity (ML 1+4 at 121° C., ASTM D 1646) of 24; olefin block copolymer OBC2 is a high elasticity olefin block copolymer having a melt index I2 of 1 g/10 minutes, a density of 0.877 g/cc, an DSC melting point of 120° C., and a Compression set at 21° C. (ASTM D 395) of 17%; olefin block copolymer OBC3 is an elastic olefin block copolymer having a melt index I2 of 1 g/10 minutes, a density of 0.866 g/cc, a DSC melting point of 121° C., and a Compression set at 21° C. (ASTM D 395) of 16%; HDPE1 is a high density polyethylene having a melt index I2 of 8.25 g/10 minutes and a density of 0.965 g/cc; POE4 is an elastomeric propylene copolymer having a melt flow rate (MFR, 230° C., 2.16 kg, ASTM D 1238) of 2 g/10 minutes, a density of 0.858 g/cc, and a total crystallinity of 7%; PP3 is an propylene homopolymer having a melt flow rate (MFR) of 12 g/10 minutes and a density of 0.9 g/cc; EVA2 is an ethylene-vinyl acetate copolymer masterbatch having a density of 0.99 g/cc and a melt index I2 of 18 g/10 minutes, available under the tradename SERIAC from Triacc Sul Industria e Comercia Ltda., Brazil; POE-g-MAH is a maleic anhydride grafted polyolefin elastomer, having about 0.8 wt. % maleic anhydride, a density of 0.875 g/cc and a melt index I2 of 1.25 g/10 minutes; POE-g-Am is an amine grafted polyolefin elastomer having a density of about 0.87 g/cc and prepared from a POE grafted with MAH to ~0.8 wt % with a MI of 5 and a then converted to an imidized amine using 3.0 molar equivalents of ethylethylenediamine in a reactive extruder. OBC-g-AM is an amine grafted olefin block copolymer and is prepared from a 1.17% MAH grafted OBC (density=0.877, MI of 3.04) by a reactive extrusion process using 3 molar equivalents of ethylethylenediamine. EVA3 is an ethylene-vinyl acetate copolymer, 28% vinyl acetate, having a density of 0.949 g/cc and a melt index I2 of 25 g/10 minutes.

The above formulations, Samples 12-23, are compounded and formed into injection molded plaques 2 cm by 10 cm by 4 cm. The adhesive performance of the molded plaques for Samples 12-23 are tested for adhesive performance to PVC plaques of similar dimension according to the following method. A conventional solvent based UV primer (Tapper UV6) is applied to the PVC and polyolefin plaques and UV cured for 15 seconds using an 80 watt/cm lamp at 3 mt/min. A polyurethane adhesive (15% solids, Byer DESMOCOLL 540) is then applied to the PVC and polyolefin plaques. The adhesive is activated at a temperature of about 73° C. and a polyolefin plaque and a PVC plaque are manually pressed together at a force of about 3.25 kg/cm2 to adhere the plaques together. The adhered plaques are then aged for 1, 24, and 120 hours and tested for adhesion force by pulling the plaques apart at 100 mm/min and measuring the maximum adhesion force sustained for more than 3 seconds. The results of the adhesion force—aging test are given in Table 4. Adhesion forces above about 6 kgf/cm are considered acceptable for footwear injection molded structural shock absorbers.

TABLE 4

| | Adhesion Force (kgf/cm) at aging of | | |
|---|---|---|---|
| Sample | 1-hour | 24-hour | 120-hour |
| 12 | 1.1 | 1.9 | 3.4 |
| 13 | 1.6 | 2.6 | 4.1 |
| 14 | 6.2 | 9.6 | 9.6 |
| 15 | 6.2 | 10.1 | 10.2 |
| 16 | 5.1 | 7.0 | 5.1 |
| 17 | 0 | 0.4 | 0.5 |
| 18 | 0 | 0.7 | 0.9 |
| 19 | 6.1 | 10.7 | 10.5 |
| 20 | 2.2 | 5.2 | 4.6 |
| 21 | 2.4 | 2.2 | 2.0 |
| 22 | 6.4 | 9.7 | 6.3 |
| 23 | 5.2 | 8.3 | 7.9 |

Additional formulations, 24-34 are formulated according to Table 5 below (values shown are in weight percent).

TABLE 5

| Formulation number | POE1 | OBC2 | HDPE1 | PP3 | EVA2 | OREVAC 9318 (%) | OREVAC 9304 (%) | EVA3 |
|---|---|---|---|---|---|---|---|---|
| 24 | | 60 | 15 | | | | | 25 |
| 25 | | 60 | | 15 | | | | 25 |
| 26 | | 65 | 15 | | | | 20 | |
| 27 | | 65 | 15 | | | | 20 | |
| 28 | | 65 | 15 | | 20 | | | |
| 29 | | 65 | 15 | | 20 | | | |
| 30 | | 65 | 15 | | 20 | | | |
| 31 | 65 | | | 15 | | | 20 | |
| 32 | 65 | | | 15 | 20 | | | |
| 33 | 65 | | | 15 | | | | 20 |
| 34 | 60 | | | 15 | | 5 | | 20 |

The compounds having the same designations as in the tables above are the same polymer formulations, while OREVAC 9318 and OREVAC 9304 are EVA ter-polymers available from Arkema Corporation (France). In order to look at whether the compounding order had effect on end properties, compounds 26 and 27 have identical formulations, but in compound 26 all compounds are mixed at the same time, while in compound 27, HDPE1 is added after the first two components are blended. Similarly, compounds 28, 29, and 30 have the same formulations, but in 28 all compounds are mixed at the same time, while in 29 OBC2 and EVA2 are mixed together, with the subsequent addition of HDPE1. In compound 30, OBC2 and HDPE 1 are mixed together with the subsequent addition of EVA2.

The above formulations, Samples 24-34, are compounded and formed into injection molded plaques 2 cm by 10 cm by 4 cm. The adhesive performance of the molded plaques for Samples 24-34 are tested for adhesive performance to PVC plaques of similar dimension according to the following method. A conventional solvent based UV primer (Tapper UV6) is applied to the PVC and polyolefin plaques and UV cured for 15 seconds using an 80 watt/cm lamp at 3 mt/min. A polyurethane adhesive (15% solids, Byer DESMOCOLL 540) is then applied to the PVC and polyolefin plaques. The adhesive is activated at a temperature of about 73° C. and a polyolefin plaque and a PVC plaque are manually pressed together at a force of about 3.25 kg/cm$^2$ to adhere the plaques together. The adhered plaques are then aged for 1, 24, and 120 hours and tested for adhesion force by pulling the plaques apart at 100 mm/min and measuring the maximum adhesion force sustained for more than 3 seconds.

The results of the adhesion force—aging test are given in Table 6. Adhesion forces above about 6 kgf/cm are considered acceptable for footwear injection molded structural shock absorbers. As shown in Table 6, formulations 26, 27, and 29, in particular, have extremely good adhesion properties.

TABLE 6

| Formulation | Adhesion Force (kgf/cm) at aging of | | |
|---|---|---|---|
| | 1-hour | 24-hour | 120-hour |
| 24 | 5.40 | 8.45 | 9.15 |
| 25 | 5.70 | 8.70 | 9.15 |
| 26 | 7.25 | 11.70 | 11.60 |
| 27 | 6.30 | 11.60 | 10.65 |
| 28 | 5.95 | 8.30 | 9.25 |
| 29 | 7.90 | 10.40 | 11.15 |
| 30 | 8.70 | 9.45 | 10.20 |
| 31 | 3.60 | 7.40 | 8.15 |
| 32 | 4.25 | 6.90 | 7.65 |
| 33 | 2.50 | 6.20 | 7.30 |
| 34 | 5.30 | 7.85 | 9.05 |

In addition to the shock absorbance properties, the clarity, gloss, hardness, and transmittance properties of formulations 24-34 are studied. An important property in footwear shock absorbers is to be able to make transparent injection molded shock absorber parts. The clarity of the compound is measured in accordance with ASTM D1746, and the gloss is measured in accordance with ASTM D1746.

TABLE 7

| | Clarity and Hardness | | | | |
|---|---|---|---|---|---|
| Formulation number | Density (g/cc) | Hardness Sh A - 15 sec | Clarity (%) 80 mill. mold | Gloss 45 deg (%) 80 mill Mold | Transmittance (%) 80 mill. mold |
| 24 | 0.9037 | 83.58 | 29.44 | 37.72 | 68.32 |
| 25 | 0.8968 | 78.76 | 37.64 | 40.58 | 68.48 |
| 26 | 0.905 | 82.26 | 7.08 | 42.36 | 53.22 |
| 27 | 0.9004 | 82.24 | 6.8 | 44.14 | 53.14 |
| 28 | 0.9193 | 82.24 | 6.6 | 44.4 | 47.04 |
| 29 | | | | | |
| 30 | 0.9188 | 82.56 | 6.22 | 43.7 | 48.22 |
| 31 | 0.8977 | 82.02 | 66.52 | 50.84 | 90.68 |
| 32 | 0.8927 | 83.5 | 65.4 | 45.8 | 90.34 |
| 33 | 0.8931 | 82.24 | 66.18 | 46.08 | 89.74 |
| 34 | 0.8993 | 82.72 | 65.2 | 46.62 | 90.14 |

Additional formulations, 35-47 are formulated according to Table 8 below (values are in weight percent).

TABLE 8

| Formulation number | POE1 | OBC2 | HDPE1 | PP3 | PP1 | OREVAC 9304 | OREVAC 9305 | OREVAC CA 100 | EVA3 | EVA2 |
|---|---|---|---|---|---|---|---|---|---|---|
| 35 | | 65 | 15 | | | 20 | | | | |
| 36 | | 65 | | 15 | | 20 | | | | |
| 37 | | 65 | | 10 | | 20 | | 5 | | |
| 38 | | 65 | | | | 20 | | | 15 | |
| 39 | | 65 | 15 | | | 10 | 10 | | | |
| 40 | | 65 | 15 | | | | | | | 20 |
| 41 | 40 | | | | 15 | | | | 45 | |
| 42 | 65 | | | | 10 | 10 | | 5 | | 10 |
| 43 | 65 | | | 15 | | 20 | | | | |
| 44 | 65 | | 15 | | | 20 | | | | |
| 45 | 65 | | | 10 | | 20 | | 5 | | |
| 46 | 65 | | | | | 20 | | | 15 | |
| 47 | 65 | | | | 15 | | | | | 20 |

The compounds having the same designations as in the tables above are the same polymer formulations, while OREVAC 9318 and OREVAC 9304 are EVA ter-polymers available from Arkema Corporation (France). EVA3 is an ethylene-vinyl acetate copolymer, 28% vinyl acetate, having a density of 0.949 g/cc and a melt index I2 of 25 g 10 minutes made by Braskem (Brazil).

The above formulations, Samples 35-47, are compounded and formed into injection molded plaques 2 cm by 10 cm by 4 cm. The adhesive performance of the molded plaques for Samples 35-47 are tested for adhesive performance to PVC plaques of similar dimension according to the following method. A conventional solvent based UV primer (Tapper UV6) is applied to the PVC and polyolefin plaques and UV cured for 15 seconds using an 80 watt/cm lamp at 3 mt/min. A polyurethane adhesive (15% solids, Byer DESMOCOLL 540) is then applied to the PVC and polyolefin plaques. The adhesive is activated at a temperature of about 73° C. and a polyolefin plaque and a PVC plaque are manually pressed together at a force of about 3.25 kg/cm$^2$ to adhere the plaques together. The adhered plaques are then aged for 1, 24, and 120 hours and tested for adhesion force by pulling the plaques apart at 100 mm/min and measuring the maximum adhesion force sustained for more than 3 seconds. The results of the adhesion force—aging test are given in Table 6. Adhesion forces above about 6 kgf/cm are considered acceptable for footwear injection molded structural shock absorbers.

TABLE 9

| Sample | Kg/cm (1 hr) | Kg/cm (24 hr) | Kg/cm (120 hr) |
|---|---|---|---|
| 41 | 8.65 | 8.85 | 7.9 |
| 42 | 9 | 10 | 9.9 |
| 35 | 11.1 | 12.75 | 12.6 |
| 36 | 11.1 | 11.05 | 12.6 |
| 37 | 9.9 | 11.75 | 13.15 |
| 38 | 11.25 | 12.55 | 12.7 |
| 39 | 9.65 | 11.8 | 12.2 |
| 40 | 11.5 | 12.85 | 11.45 |
| 43 | 6.1 | 9.05 | 9.35 |
| 44 | 7.75 | 6.5 | 7.25 |
| 45 | 5.5 | 6.35 | 6.2 |
| 46 | 5.6 | 6.05 | 6.75 |
| 47 | 9.4 | 11.7 | 12.9 |

Additional formulations, 48-56 are formulated according to Table 8 below (values shown are in weight percent).

TABLE 10

| Formulation Number | POE1 % | OBC2 % | HDPE1 % | PP3 % | PPP % | OREVAC 9304 (7MI, 25% VA, 16% Mah) % | EVA3 % | EVA2 % | Pellethane 2355-80AE % |
|---|---|---|---|---|---|---|---|---|---|
| 48 | | 65 | 15 | | | 20 | | | |
| 49 | | 65 | | 15 | | 20 | | | |
| 50 | | 65 | 15 | | | | | 20 | |
| 51 | 40 | | | | 15 | | 45 | | |
| 52 | 65 | | | 15 | | 20 | | | |
| 53 | 65 | | 15 | | | 20 | | | |
| 54 | 65 | | | | 15 | | | 20 | |
| 55 | | | | | | | | | 100 |
| 56 | | | | | | | | | |

Pellethane 2355 is a polyester adipate with a Shore A hardness of 95, and is a thermoplastic polyurethane resin available from The Dow Chemical Company, Midland, Mich.

The Shore hardness, melt index, strength, compression, adhesion force, and other properties of these formulations are measured as above, and the results presented in Tables 11A and 11B below.

TABLE 11A

| Formulation Number | Compression Set 22° C. % | Compression Set 70° C. % | MD Tensile Strength psi | Ult Elongation % | Adhesion Force @ 120 hr Kgf/cm |
|---|---|---|---|---|---|
| 48 | 25 | 65 | 1021 | 556 | 12.6 |
| 49 | 23 | 69 | 1076 | 456 | 12.6 |
| 50 | 26 | 57 | 1179 | 732 | 11.5 |
| 51 | 36 | 100 | 1297 | 527 | 7.9 |
| 52 | 37 | | 1821 | 693 | 8.5 |
| 53 | 37 | | 1546 | 694 | 7 |
| 54 | 35 | | 1328 | 462 | 13 |
| 55 | 30 | 87 | 6097 | 534 | 6 to 9* |
| 56 | 34 | 95 | 2393 | 682 | 5 to 7** |

TABLE 11B

| Formulation Number | MI I2 @ 190 C. g/10 min | Density gr/cc | Hardness Shore A | Flex Modulus ksi | Die C. Tear lbf/in |
|---|---|---|---|---|---|
| 48 | 1.95 | 0.903 | 85 | 9.3 | 369 |
| 49 | 1.76 | 0.896 | 86 | 14.1 | 371 |
| 50 | 1.94 | 0.921 | 85 | 9.2 | 370 |
| 51 | 2.54 | 0.917 | 87 | 9.9 | 405 |
| 52 | 2.11 | 0.899 | 86 | 9.7 | 385 |
| 53 | 2.06 | 0.908 | 89 | 7.8 | 367 |
| 54 | 1.12 | 0.915 | 88 | 12.9 | 378 |
| 55 | 2 | 1.2 | 87 | 6.7 | 605 |
| 56 | 4.97 | 1.053 | 79 | | 294 |

One advantage of using polyolefin compounds according to the embodiments herein to form a shock absorbing layer is a lower material cost. For example, more expensive PU and PEE based compounds have been used in shock absorbing applications, such as athletic shoes. By using polyolefin according to embodiments disclosed herein, a high value composite, such as a shoe, may be produced to achieve mid- to high-level performance at lower cost.

Another advantage of using polyolefin compounds according to the embodiments disclosed herein is an increased ease of material processing using various melt flow methods, for example, injection molding, extrusion, or blow molding. Due to the limited amount of cross-linking, polyolefin compounds according to embodiments disclosed herein may possess a better flowability as compared to a highly cross-linked material, such as a polyurethane.

Yet another advantage of using polyolefin compounds according to the embodiments herein is better recyclability of the material, as compared to other materials commonly used in shock absorbing layers. To the contrary, polyolefin compounds disclosed herein may be re-used and re-cycled via various thermal melt flow processes, for example, injection molding or extrusion.

Another advantage of using polyolefin compounds disclosed herein, requiring the use of at least one functional polymer, is cost savings. For example, good adhesion may be maintained when the functional polymer is a part of the continuous phase within the polyolefin compound. To the contrary, many other composite Applications must either rely on high-cost materials, such as TPU's, to provide adhesion.

One advantage of using thermoplastic olefin copolymers in combination with a compatible function polyolefin polymer according to embodiments herein is achievement of good thermal resistance, good transparency, and an adhesive strength that may be sufficient for low- to mid-performance shock absorbing applications.

One advantage of using olefin block copolymers in a polyolefin compound according to the embodiments herein is to achieve enhanced temperature resistance, enhanced elasticity, and good adhesion when combined with a compatible functional olefin polymer. Another advantage of using olefin block copolymers is a higher crystallization temperature that can significantly lower the processing cycle time, for example, the injection molding cycle time, and thus may improve the manufacturing efficiency.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A polyolefin compound comprising:
    A) at least one thermoplastic olefin copolymer comprising the reaction product of olefin 1 and olefin 2, wherein:
        olefin 1 is a $C_2$ based olefin and olefin 2 is a $C_3$ to $C_8$ α-olefin; or
        olefin 1 is a $C_3$ based olefin and olefin 2 is a $C_4$ to $C_8$ α-olefin;
    B) at least one functional polymer, the functional polymer content in the polyolefin compound being between 1 and 75 weight percent of the combined components A and B;
    C) at least one thermoplastic olefin homopolymer, wherein the olefin homopolymer forms a dispersed phase; wherein the thermoplastic olefin copolymer and the functional polymer form a continuous phase; wherein:
        a) an I2 melt index of the polyolefin compound is from about 1 to about 15 g/10 min as measured using ASTM D1238 at 190° C.;
        b) a Shore A hardness of the polyolefin compound is from about 55 to about 100 as measured using ASTM D2240;
        c) a flexural modulus of the polyolefin compound is from about 0.8 to about 30 kpsi as measured using ASTM D790.

2. The polyolefin compound according to claim 1, the component B comprising an ethylene vinyl acetate copolymer having a vinyl acetate content of not less than 40 weight percent of the ethylene vinyl acetate copolymer.

3. The polyolefin compound according to claim 1, the component B comprising a maleic anhydride, amine, or hydroxyl grafted polypropylene or polyethylene.

4. The polyolefin compound according to claim 1, wherein component B comprises a grafted olefin copolymer comprising an olefin-vinyl acetate-maleic anhydride terpolymer.

5. A composite comprising:
    at least one shock absorbing layer comprising a polyolefin compound and at least one non-polyolefin substrate layer, the polyolefin compound comprising:
        A) at least one thermoplastic olefin copolymer comprising the reaction product of olefin 1 and olefin 2, wherein:
            olefin 1 is a $C_2$ based olefin and olefin 2 is a $C_3$ to $C_8$ α-olefin; or
            olefin 1 is a $C_3$ based olefin and olefin 2 is a $C_4$ to $C_8$ α-olefin;
        B) at least one functional polymer, the functional polymer content in the polyolefin compound being between 1 and 75 weight percent of the combined components A and B;
        C) at least one thermoplastic olefin homopolymer, wherein the olefin homopolymer forms a dispersed phase;
        wherein the thermoplastic olefin copolymer and the functional polymer form a continuous phase;
        wherein:
            a) an I2 melt index of the polyolefin compound is from about 1 to about 15 g/10 min as measured using ASTM D1238 at 190° C.;
            b) a Shore A hardness of the polyolefin compound is from about 55 to about 100 as measured using ASTM D2240;
            c) a flexural modulus of the polyolefin compound is from about 0.8 to about 30 kpsi as measured using ASTM D790.

6. The composite according to claim 5, the component B comprising an ethylene vinyl acetate copolymer having a vinyl acetate content of not less than 40 weight percent of the ethylene vinyl acetate copolymer.

7. The composite according to claim 5, the component B comprising a maleic anhydride, amine, or hydroxyl grafted polypropylene or polyethylene.

8. The polyolefin compound according to claim 5, wherein component B comprises a grafted olefin copolymer comprising an olefin-vinyl acetate-maleic anhydride terpolymer.

9. A shoe composite having at least one shock absorbing layer comprising the polyolefin compound in claim 1, and at least one non-polyolefin substrate layer.

10. A car bumper composite having at least one shock absorbing layer comprising the polyolefin elastomer in claim 1, and at least one non-polyolefin substrate layer.

11. An artificial turf composite having at least one shock absorbing layer comprising a polyolefin elastomer comprising,
    A) at least one thermoplastic olefin copolymer comprising the reaction product of olefin 1 and olefin 2, wherein:
        olefin 1 is a $C_2$ based olefin and olefin 2 is a $C_3$ to $C_8$ α-olefin; or
        olefin 1 is a $C_3$ based olefin and olefin 2 is a $C_4$ to $C_8$ α-olefin;
    B) at least one functional polymer, the functional polymer content in the polyolefin compound being between 1 and 75 weight percent of the combined components A and B;
    wherein the thermoplastic olefin copolymer and the functional polymer form a continuous phase;

wherein:
a) an I2 melt index of the polyolefin compound is from about 1 to about 15 g/10 min as measured using ASTM D1238 at 190° C.;
b) a Shore A hardness of the polyolefin compound is from about 55 to about 100 as measured using ASTM D2240;
c) a flexural modulus compound is from about 0.8 to about 30 kpsi as measured using ASTM D790; and
at least one non-polyolefin substrate layer.

12. The compound of claim 1 in the form of an adhesive.

* * * * *